J. A. BRIED.
SCREEN FRAME.
APPLICATION FILED AUG. 25, 1915.
1,207,850.
Patented Dec. 12, 1916.
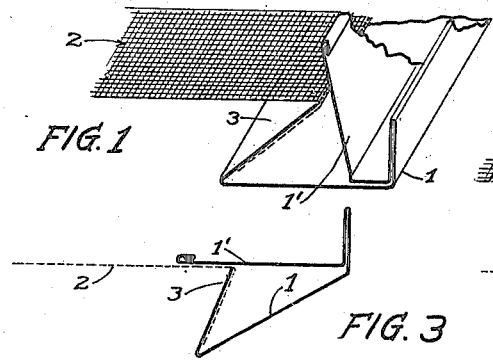
FIG. 1
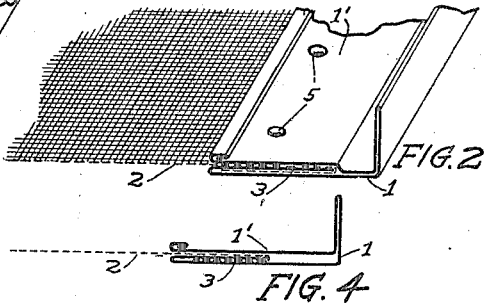
FIG. 2
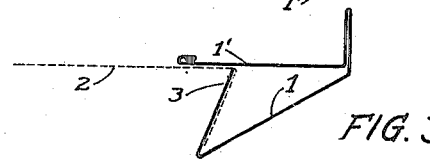
FIG. 3
FIG. 4
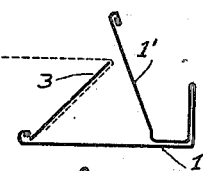
FIG. 5
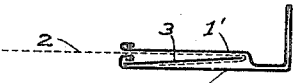
FIG. 6
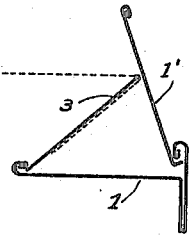
FIG. 7
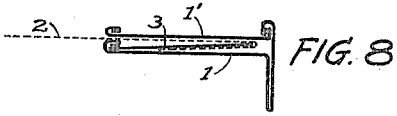
FIG. 8
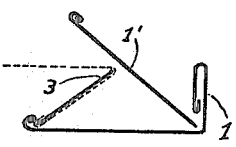
FIG. 9
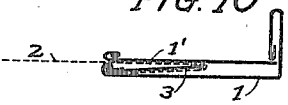
FIG. 10
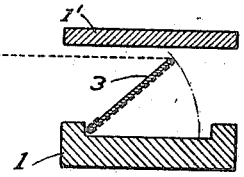
FIG. 11
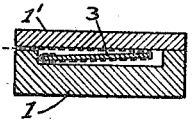
FIG. 12
FIG. 13
WITNESSES:
Willard W. King
Clement L. Bried
INVENTOR
Julien A. Bried

UNITED STATES PATENT OFFICE.

JULIEN A. BRIED, OF OAKLAND, CALIFORNIA.

SCREEN-FRAME.

1,207,850.　　　　Specification of Letters Patent.　　Patented Dec. 12, 1916.

Application filed August 23, 1915. Serial No. 46,849.

*To all whom it may concern:*

Be it known that I, JULIEN A. BRIED, a citizen of the United States, residing at Oakland, in the county of Alameda and State of California, have invented a new and useful Improvement in Screen-Frames, of which the following is a specification, and which is illustrated in the accompanying drawings.

My invention relates to improvements in the construction of screen frames for windows, doors or the like and particularly to the arrangement of parts within the frame molding for obtaining a tension in the screen fabric, so that it will be tightly stretched after the frame is put together. I attain these objects by the device illustrated in the accompanying drawing in which the figures all show in modified form, the same constructional features, and the same numerals in the several figures designate parts having similar functions and they consist in every case of a frame molding, a moving strut or toggle tension plate, hereinafter called a toggle plate, for tensioning the screen and a screen sheet hooked over said toggle plate.

Figures 1, 3, 5, 7, and 9, show in cross section various forms of a sheet metal molding, being one side of the improved frame, assembled with the screen sheet ready for closing together. Figs. 2, 4, 6, 8 and 10 show respectively the same moldings in closed position ready for riveting together and Fig. 13, shows two sides of a finished frame riveted together and with corner stiffening plates attached; said corner plates being of any suitable form and on one or both sides of the mitered joint of the molding. Fig. 11, shows a section of a wooden molding with a screen fabric passed over and around a metal toggle plate, ready for forcing into tensioning position and Fig. 12, shows the same construction after closing up with the cover board nailed on.

In all the figures in the drawing, the main part of the molding section is designated by the numeral 1, and the cover plate portion by 1', the screen fabric is designated by the numeral 2 and is shown hooked over the toggle plate 3.

The toggle plate 3 in Figs. 5, 7 and 9, is shown as a loose plate or strip of metal supported at its inner edge against a lip formed by the inwardly turned edge of one side of the molding section, but in Figs. 1 and 3, it is shown continuous with one side of the molding section.

In Fig. 11 the toggle plate is shown applied to a wooden frame and resting against a lip formed thereon, and in this connection it may be stated that the toggle plate can be conveniently made of wood instead of metal if desired.

The loose form of toggle plate is preferable to the form continuous with the metal of the molding as it permits the screen fabric to be passed over the upper edge, down the side and also around the under edge, the pressure at this point serving to hold it from slipping, this method is shown in Figs. 9, 10, 11 and 12; but in all cases its action is the same, for in being forced from an angle downward toward the plane of the screen frame with the fabric hooked over it or otherwise attached, it carries the sides of the fabric outward with great force and produces a high degree of tension in the same. After the toggle plate is forced flat, the covering side 1' of the molding is brought against it and the whole riveted or fastened together as shown at 5 in Figs. 2 and 13; the toggle plate may be used in one or all sides of the screen frame molding and it may be of several separate pieces, or one long piece in each side, a little shorter than the sides of the frame.

In Figs. 7, 9, and 11, the covering side of the molding is shown loose, which is an advantage in putting the frames together and in Figs. 7 and 8 in a sheet metal molding, said loose side is shown with its outer edge hooked under the edge of the transverse stiffening member of the L section molding.

It will be observed from the drawings that in all the various sheet metal molding forms the section is L shaped to afford maximum stiffness in both directions and to form flat square sides and edges to make it easy to effect a snug fit to openings in window frames, doors or other places.

In forming the sheet metal molding the edges of the metal are turned over so that there are no sharp corners to cut the fabric where the same enters the frame, and when galvanized or tinned metal is used to make the molding, there are no raw edges to rust.

Having thus described my invention, it will be seen that I have provided a metal screen frame of simple construction which contains within it an element for producing great tension upon the screen fabric; thus entirely obviating the use of auxiliary means to accomplish this or the great difficulty attendant upon the regular methods of stretching such fabric when making up screens; and it will also be seen that the tensioning element can be used on a wooden screen frame or door, if the same be provided with an edge against which to rest said element, and that said element may also be of wood if desired; and that said element may, in case of small frames, be supported at its ends only, instead of one entire edge. Therefore I do not wish to limit my claims to the actual forms shown in the drawing, but feel that I am entitled to the application of a toggle tensioning element in tensioning fabrics or sheets of material of any kind in any connection whatsoever, wherein its point of engagement with the fabric is carried outwardly upon straightening the said toggle plate.

I claim:—

1. Means for tensioning a fabric sheet comprising a toggle plate adapted to engage at its outer edge with a fabric sheet; and means for supporting said plate at its inner edge against the tension developed in said sheet when the said plate is forced toward a plane parallel with the said sheet.

2. In a frame for tensioning a fabric sheet, a moving strut plate fulcrumed along its inner edge to the frame and adapted for engagement at its opposite edge with said sheet and arranged to carry the same outwardly when the said moving strut plate is forced toward the plane of the frame.

3. In a frame for tensioning a screen sheet, a tensioning member consisting of a plate, on one or more sides of the frame, with its inner edge supported by the frame and the other edge engaged with a screen sheet; the said plate being movable from a position at an angle with, to a position approximately in plane with the frame to carry the engaged edge of the screen sheet outwardly and thereby cause tension in said screen sheet.

4. In a screen frame, means for tensioning a screen sheet comprising a long narrow plate form toggle member fulcrumed to the frame at its inner edge and adapted to engage at its free edge with a screen sheet and arranged to carry the engaged portion of the said sheet outwardly when forced from a position at an angle with, toward the plane of the screen frame.

5. A screen frame comprising a molding, a toggle plate longitudinal with and fulcrumed at its inner edge to said molding and a separable side on said molding adapted to cover the toggle plate when the same is placed approximately into the plane of the frame.

6. In a metal screen frame, an L shaped molding section of double thickness, one side of its long leg being removable, said side having its outer edge turned to form a hook adapted to hook under the inwardly turned edge of the short leg, a toggle plate fulcrumed to the inner side of the long leg, adapted for engagement at its free edge with a screen sheet and arranged to carry the same outwardly and cause tension in the screen sheet when forced toward the plane of the frame, the removable side of the frame being adapted when in position to cover the said toggle plate after the latter has been forced into tensioning position.

JULIEN A. BRIED.

Witnesses:
WILLARD W. KING,
CLEMENT L. BRIED.

Copies of this patent may be obtained for five cents each, by addressing the "Commissioner of Patents, Washington, D. C."